(12) United States Patent
Maloney

(10) Patent No.: US 7,374,381 B2
(45) Date of Patent: May 20, 2008

(54) DOUBLE FLUSH CLINCH STUD

(75) Inventor: Michael J Maloney, Doylestown, PA (US)

(73) Assignee: PEM Management, Inc,, Wilmington, DE (US)

( * ) Notice: Subject to any disclaimer, the term of this patent is extended or adjusted under 35 U.S.C. 154(b) by 321 days.

(21) Appl. No.: 11/163,138

(22) Filed: Oct. 6, 2005

(65) Prior Publication Data

US 2006/0099050 A1    May 11, 2006

Related U.S. Application Data

(60) Provisional application No. 60/620,345, filed on Oct. 21, 2004.

(51) Int. Cl.
*F16B 37/04* (2006.01)
*F16B 19/08* (2006.01)

(52) U.S. Cl. ............... 411/180; 411/501; 403/408.1

(58) Field of Classification Search ............ 411/180, 411/501; 403/408.1
See application file for complete search history.

(56) References Cited

U.S. PATENT DOCUMENTS

| | | | |
|---|---|---|---|
| 2,347,219 A * | 4/1944 | Schnell .................... 188/206 A |
| 2,707,322 A | 5/1955 | Strain et al. |
| 3,000,680 A * | 9/1961 | Zelenko ..................... 312/111 |
| 3,242,962 A * | 3/1966 | Dupree ...................... 411/180 |
| 3,270,793 A * | 9/1966 | Polmon ...................... 411/180 |
| 3,571,903 A * | 3/1971 | Persson ..................... 29/432.1 |
| 3,646,981 A * | 3/1972 | Barnes ......................... 411/82 |
| 3,770,037 A * | 11/1973 | Ernest ....................... 411/184 |
| 3,782,436 A * | 1/1974 | Steiner ...................... 411/184 |
| 3,909,913 A | 10/1975 | Tildesley |
| 3,967,669 A * | 7/1976 | Egner ......................... 411/184 |
| 4,202,243 A * | 5/1980 | Leonhardt .................. 411/501 |
| 4,371,300 A * | 2/1983 | Ringham ..................... 411/41 |
| 4,637,766 A * | 1/1987 | Milliser ..................... 411/180 |
| 4,800,643 A * | 1/1989 | Higgins ....................... 29/458 |
| 4,812,193 A * | 3/1989 | Gauron ....................... 156/293 |
| 4,842,462 A * | 6/1989 | Tildesley ................... 411/180 |
| 4,943,067 A * | 7/1990 | Saunders .................... 473/578 |
| 4,959,002 A * | 9/1990 | Pleasant .................. 425/192 R |
| 5,201,623 A * | 4/1993 | Benedetti et al. .............. 411/48 |
| 5,261,759 A * | 11/1993 | Decoux .................... 403/408.1 |
| 5,378,099 A * | 1/1995 | Gauron ...................... 411/82.1 |
| RE34,928 E | 5/1995 | Highfield |
| 5,445,483 A * | 8/1995 | Fultz .......................... 411/181 |
| 5,452,978 A * | 9/1995 | Winton, III ................. 411/180 |
| 5,465,597 A * | 11/1995 | Bajraszewski et al. ....... 72/19.8 |
| 5,508,758 A * | 4/1996 | Marui et al. ................. 351/141 |
| 5,556,220 A * | 9/1996 | Lautenschlager et al. ... 403/298 |
| 5,632,582 A * | 5/1997 | Gauron ...................... 411/82.1 |
| 5,647,114 A * | 7/1997 | Pleasant .................. 29/525.11 |

(Continued)

*Primary Examiner*—Katherine Mitchell

(57) ABSTRACT

A double flush clinch stud includes adjacent clinch means of different diameters with planar end surfaces. The stud may be employed in forming an assembly wherein two metal sheets are joined in face-to-face contacting relationship. This assembly can provide a flush attachment on the outside surfaces of both sheets when the length of the stud is equal to the combined widths of the sheets. In an alternative embodiment, the top undercut groove can be adapted to be underfilled with the material of the top sheet. In this alternate configuration, the top sheet is effectively constrained between the head of the fastener and the second sheet while permitting the top sheet to pivot with respect to the second sheet.

7 Claims, 2 Drawing Sheets

U.S. PATENT DOCUMENTS

| | | | | |
|---|---|---|---|---|
| 6,045,288 A | * | 4/2000 | Pasternak et al. | 403/109.3 |
| 6,089,805 A | * | 7/2000 | Salmon | 411/45 |
| 6,364,651 B1 | * | 4/2002 | Pleasant | 425/192 R |
| 6,877,204 B1 | | 4/2005 | Schnabel et al. | |
| 2004/0052581 A1 | * | 3/2004 | Assler et al. | 403/408.1 |
| 2006/0018709 A1 | * | 1/2006 | Doerr et al. | 403/408.1 |
| 2006/0051181 A1 | * | 3/2006 | Winton, III | 411/180 |
| 2006/0099050 A1 | * | 5/2006 | Maloney | 411/500 |
| 2006/0177285 A1 | * | 8/2006 | Maloney | 411/501 |

* cited by examiner

DOUBLE FLUSH CLINCH STUD

RELATED APPLICATIONS

The present application is related to provisional patent application Ser. No. 60/620,345 entitled "Double Flush Clinch Stud" filed on Oct. 21, 2004, priority from which is hereby claimed.

FIELD OF THE INVENTION

The present invention relates to fasteners for securing two sheets of metal face-to-face. It further relates to fasteners that provide a flush attachment to the sheets by deformation of the sheet material.

BACKGROUND OF THE INVENTION AND PRIOR ART

Most commonly, metal sheets are fastened together using rivets or spot welds. These methods of fastening, however, have their drawbacks inasmuch as the spot welds leave a weld scale and burn the surface of the sheets. Spot welding is also not effective in sheet materials which are not easily welded, such as is the case with very thin or dissimilar materials. Furthermore, the burned sheets may leave an unacceptable aesthetic appearance. Rivets can perform a similar function but they do not leave a finish flush with the surface of the sheets which may be a requirement in some applications. As yet another alternative, adhesives or other bonding agents such as epoxies can be used, however these are often very messy and very costly. Additional methods such as Tog-L-Loc® which forms sheets together and Henrob style fasteners deform the sheets being attached. Allowing for rotation is also possible. Of the technologies discussed above, the additional feature of rotation can only be accomplished by a rivet which does not install flush.

U.S. Pat. No. 3,242,962 to Dupree discloses a double-sided clinch type insert which installs between the sheets being joined. However, there are many problems and disadvantages of the Dupree fastener. For example, it allows for installation of only one fastener, due to the fact that once the sheets are joined nothing additional can be inserted between them. This also negates the advantage of autofeeding and installing the Dupree fastener using more efficient, modern techniques. In addition, the Dupree fastener must be the same thickness as the width of the combined sheets. And finally, while the Dupree fastener may be modified to permit rotation by removing a knurl in one of the undercuts, the rotating clinch would significantly weaken and fail after numerous cycles.

There is therefore a need in the art for means for securing two metal sheets together which provides flush finish on both metal sheets, with the additional feature of providing a pivot for rotation, and avoids the weld scale or epoxy mess of the aforementioned fastening methods.

SUMMARY OF THE INVENTION

The present invention provides an extremely simple solution to the above-stated need in the art for a fastening method which secures two metal sheets face-to-face. The device is a clinching stud having adjacent fastening means of differing diameter so that the stud may be pressed into suitably dimensioned holes of aligned sheets in a single pressing operation. As will be more fully described herein, double flush attachment is provided without the need for the heat of welding or the mess and expense of bonding adhesives, or deformation of the surface of the sheets being bonded.

More specifically, the applicant has devised a clinch-type fastener for joining parallel sheets having aligned apertures comprising a shank having a head at one end and an endcap at the opposite end, the head being a first displacer, a top surface, and being of the largest diameter of the fastener. A first undercut groove on the shank is located immediately below the first displacer having a first diameter and a second displacer on the shank located immediately below the first undercut groove having a second diameter less than the first diameter. A second undercut groove on the shank is located immediately below the second displacer, and the endcap is located immediately below the undercut groove and is of lesser diameter than the second displacer. The fastener preferably includes opposing planar circular top and bottom surfaces.

The inventive fastener is advantageously employed in forming an assembly wherein two metal sheets are joined in face-to-face contacting relationship, the first sheet having a first hole therein including sidewalls which occupy substantially all of the first undercut groove of the fastener and wherein the second planar sheet is joined in face-to-face relationship with the first sheet. The second sheet has a second hole therein of lesser diameter than the first hole in the first sheet and is concentric therewith. The second hole is of lesser diameter than the first hole and includes sidewalls which occupy substantially all of the second undercut groove of the fastener. This assembly provides flush attachment with a top surface of the first sheet being coplanar with a top surface of the head of the fastener and the endface of the endcap of the fastener being flush or sub-flush with the bottom surface of the second sheet. This results in an assembly whereby the top undercut groove can alternatively be underfilled with the material of the top sheet respectively, while maintaining a high pushout strength. With this alternative, the top sheet is effectively constrained between the head of the fastener and the second sheet while permitting a strong pivot joint. Pushout performance remains high due to the larger diameter, and hence, displaced volume, of the top displacer and undercut.

Compared with some of the prior art described above such as the Dupree fastener, the present invention provides the advantage of installing from the top of the sheets and therefore can be installed in any pattern on multiple fasteners as desired. Additionally, the present invention only requires a minimum thickness of the second sheet and the second sheet can be thicker than the lower shank of the fastener if the fastener is installed blind in the second sheet. Also, according to the invention as will be more fully described below, the top sheet is contained between the head of the fastener and the second sheet. This permits the top sheet to rotate freely by underfilling the undercut while maintaining a high push-out force and flush installation.

From the following drawings and description of the preferred embodiment, it will be appreciated by those of skill in the art that the objects of the invention have been achieved. While the present invention will be described with the reference to a specific embodiment, the following description is illustrative of the invention and is not to be construed as limiting the invention. Various modifications to the present invention can be made to the preferred embodiment by those skilled in the art without departing from the true spirit and scope of the invention. It will be noted here that for better understanding like components are designated by the reference numerals throughout the various figures of drawing which follow.

DESCRIPTION OF THE PREFERRED EMBODIMENT

Figure 1:
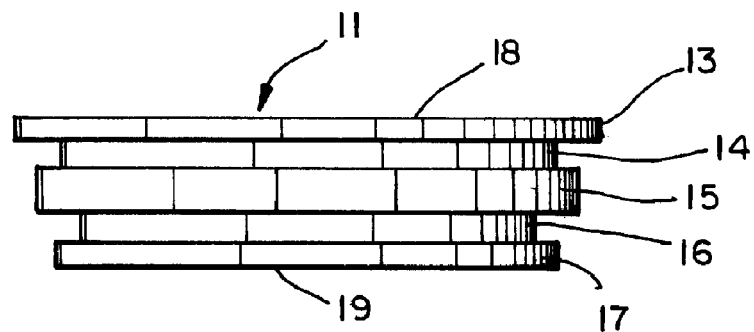
FIG. 1 is a side view of the clinch stud of the invention with the displacers and undercuts indicated.

Referring now to FIG. 1, the present invention is a clinch-type fastener which has two pairs of displacers 13 and 15 and related undercuts 14 and 16 coaxially adjacent one another, the first pair 13 and 14 being larger in diameter than the other pair. The fastener is terminated at the bottom by endcap 17. These structures lie along a shank of the fastener between a top surface 18 and a bottom surface 19 of endcap 17.

Figure 2:
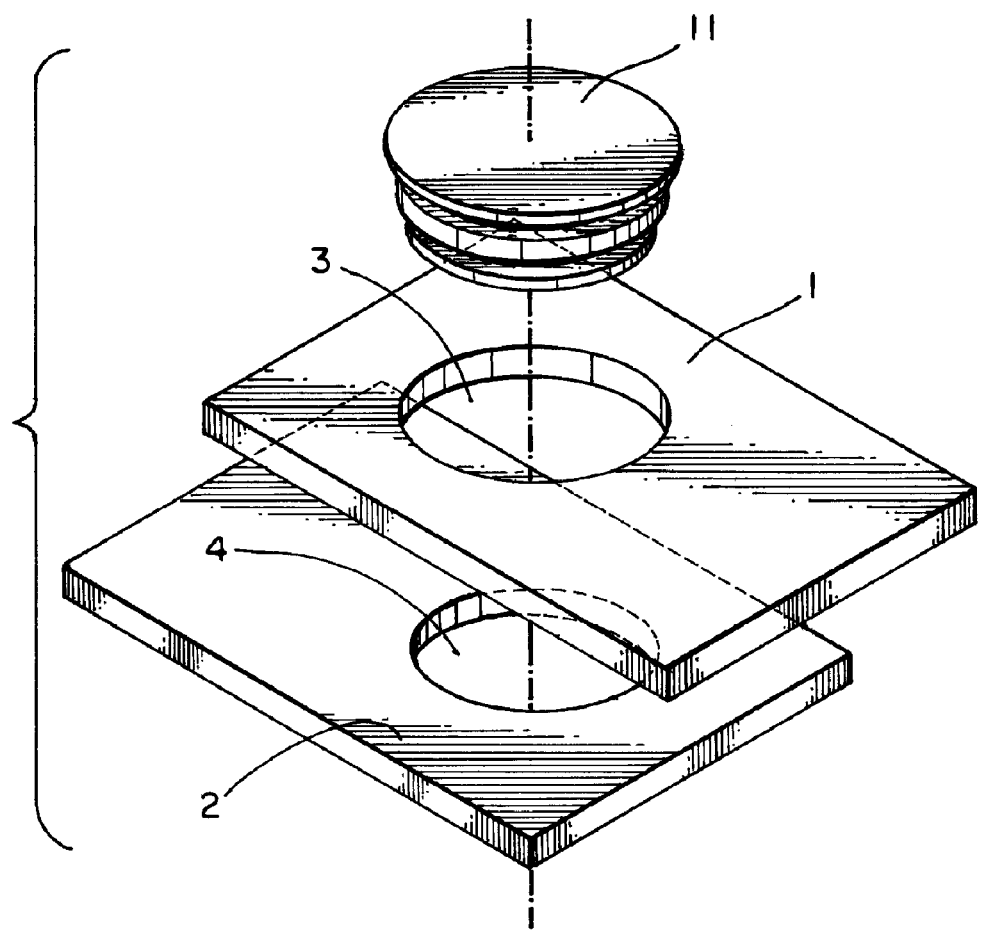
FIG. 2 is a right front top exploded assembly view of the clinch connector in alignment with the receiving apertures of two sheets to be fastened.

As shown in FIG. 2, two sheets 1 and 2 are held in alignment with the clinch connector of the invention being forcibly applied from above. Sheets 1 and 2 are shown separated in this figure for illustration only. The top sheet and second sheet include aligned holes 3 and 4 of different diameter which correspond to the diameters of the respective displacers and undercuts of the connector. The diameter of hole 3 in the top sheet is greater than the diameter of hole 4 in the second sheet, allowing the first advancing clinching feature of the connector to pass through it.

Figure 3:
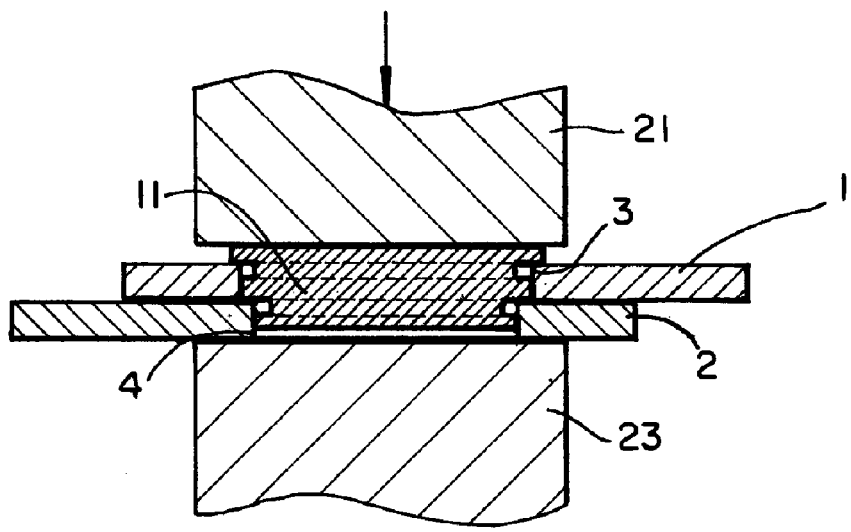
FIG. 3 is a partial side sectional view of the installation of the invention by pressing.

As depicted in FIG. 3, an installation force is applied to punch 21 which forces the clinch connector of the invention 11 into sheets 1 and 2 against installation anvil 23. The arrow shows the direction of application of force to the clinch connector which is applied to the first and second sheets. The connector 11 is applied by a single application of force during a pressing operation against anvil 23 which achieves the resulting installation as shown in FIG. 4 wherein the top displacer and undercut clinch into the top of the two sheets 1 being bonded and the lower displacer and undercut simultaneously clinch into the second sheet 2.

Figure 4:
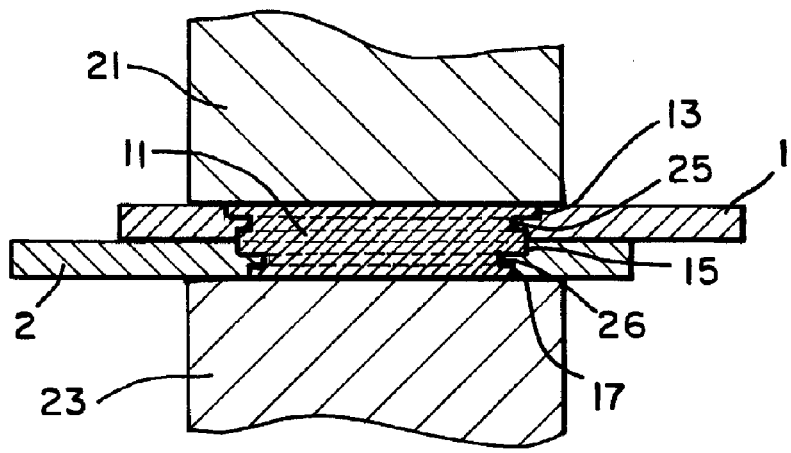
FIG. 4 is a side sectional view showing the resulting completed installation of the invention.
Figure 5:
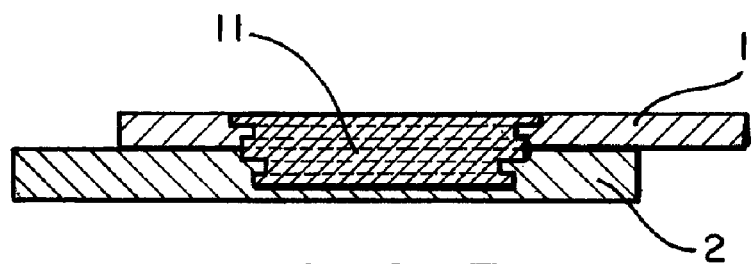
FIG. 5 is a side sectional view of an alternate embodiment of the invention in which the clinch stud is installed into a blind hole in the second sheet.

Referring now to FIG. 4, after the pressing operation is complete, the sheets become locked together by the cold flow of metal by the top head/displacer 13 forcing the cold flow of metal 25 of the top sheet into the top undercut and similarly the cold flow of metal 26 is displaced by displacer 15 into the bottom undercut within the second sheet locking the clinch stud of the invention into both sheets, thus joining them together. As depicted in FIG. 5, the second sheet 2 can have a blind hole. As a significant advantage of the invention, if the first and or second undercut grooves are of sufficient diameter such that they are underfilled by the material of their respective sheets, the present invention provides a locking pivot whereby the sheets may be attached flush in a controlled manner while providing for relative rotation between the sheets.

It should be understood that there may be other modifications and changes to the present invention that will be obvious to those of skill in the art from the foregoing description, however, the present invention should be limited only by the following claims and their legal equivalents.

What is claimed is:

1. An assembly, comprising:
   a fastener joining two metal sheets in face-to-face contacting relationship, comprising;
      a shank having a preformed head at one end and a preformed endcap at the opposite end;
      the head being a first displacer having a top surface and being the largest diameter of said fastener;
      a first undercut groove on said shank, located immediately below said first displacer, said first undercut groove having a first diameter;
      a second displacer on said shank, located immediately below said first undercut groove, said second displacer having a second diameter less than said head largest diameter and larger than said $1^{st}$ diameter;
      a second undercut groove on said shank located immediately below said second displacer; and
      the endcap located immediately below said second undercut groove and being of lesser diameter than said second displacer's second diameter;
   a first planar sheet having a first hole therein including sidewalls which occupy substantially all of said first undercut groove of said fastener; and
   a second planar sheet joined in face-to-face relation to said first sheet, said second sheet having a second hole therein of lesser diameter than said first hole in said first sheet and being concentric therewith, said second hole being of lesser diameter than said first hole and having sidewalls which occupy substantially all of said second undercut groove of said fastener, said top surface of said fastener is substantially flush with a top surface of said first sheet and an endface of said endcap of said fastener is substantially flush with a bottom surface of said second sheet.

2. The assembly of claim 1 wherein said first and second holes are circular.

3. The assembly of claim 1 wherein the second hole is a blind hole in the second sheet.

4. The assembly of claim 1 wherein the first undercut groove of said fastener is of sufficient diameter such that it is underfilled by the material of the first sheet thereby providing relative rotary motion between said fastener and said sheet.

5. The assembly of claim 4 wherein both said first and second undercut grooves are of sufficient diameter such that they are underfilled with the material of said first and second sheets respectively.

6. The assembly of claim 1, wherein the fastener top surface and the fastener endface are opposing planar top and bottom surfaces.

7. The assembly of claim 1, wherein the fastener top surface and the fastener endface are circular surfaces.

* * * * *